United States Patent
Takayanagi et al.

(10) Patent No.: US 8,004,768 B2
(45) Date of Patent: Aug. 23, 2011

(54) VEHICLE MIRROR AND MANUFACTURING METHOD THEREFOR

(75) Inventors: Shinya Takayanagi, Fujieda (JP); Masatoshi Nakamura, Fujieda (JP)

(73) Assignee: Murakami Corporation, Shizuoka (JP)

( * ) Notice: Subject to any disclaimer, the term of this patent is extended or adjusted under 35 U.S.C. 154(b) by 0 days.

(21) Appl. No.: 12/649,444

(22) Filed: Dec. 30, 2009

(65) Prior Publication Data
US 2010/0214662 A1  Aug. 26, 2010

(30) Foreign Application Priority Data
Feb. 25, 2009  (JP) ................................ 2009-042688

(51) Int. Cl.
G02B 27/14 (2006.01)
G02B 5/08 (2006.01)
G09G 5/00 (2006.01)
(52) U.S. Cl. ............. 359/630; 359/883; 359/900; 345/7
(58) Field of Classification Search .................. 359/883, 359/900, 630, 839; 345/7
See application file for complete search history.

(56) References Cited

U.S. PATENT DOCUMENTS

| 2009/0040778 A1 | 2/2009 | Takayanagi et al. |
| 2009/0085729 A1 | 4/2009 | Nakamura et al. |
| 2009/0135493 A1 | 5/2009 | Takayanagi et al. |
| 2009/0244740 A1 | 10/2009 | Takayanagi et al. |

FOREIGN PATENT DOCUMENTS

| JP | 60-49045 | 4/1985 |
| JP | 2000-153736 | 6/2000 |
| JP | 2000-255321 | 9/2000 |
| JP | 2002-67806 | 3/2002 |

*Primary Examiner* — Jack Dinh
(74) *Attorney, Agent, or Firm* — Greenblum & Bernstein, P.L.C.

(57) ABSTRACT

The present invention provides a vehicle mirror and a manufacturing method therefor which allow the rear face side of a mirror element to be dark-colored without using a color plate or color coating. A mirror element is configured by forming a semitransparent reflective film made of a dielectric multilayer film on the front face of a flat transparent substrate. A dark-colored self-adhesive film is attached to the rear face of the mirror element. The dark-colored self-adhesive film is configured by forming an adhesive layer on the rear face of a dark-colored film layer by means of application. Grid-like air release channels are formed at fine pitches with minimal depth on an entire surface of the adhesive layer. After the dark-colored self-adhesive film is attached to the rear face of the mirror element, the grid-like air release channels visible from a front side of the mirror element are eliminated by heating and/or pressurizing.

16 Claims, 7 Drawing Sheets

(FRONT SIDE OF MIRROR)

BEFORE HEATING AND PRESSURIZING (AIR RELEASE CHANNELS VISIBLE)

FIG.5B

AFTER HEATING AND PRESSURIZING (AIR RELEASE CHANNELS ELIMINATED)

VEHICLE MIRROR AND MANUFACTURING METHOD THEREFOR

The disclosure of Japanese Patent Application No. JP2009-42688 filed on Feb. 25, 2009 including the specification, drawings, claims and abstract is incorporated herein by reference in its entirety.

BACKGROUND OF THE INVENTION

1. Field of the Invention

The present invention relates to a vehicle mirror equipped with a semitransparent reflective film and a manufacturing method for the vehicle mirror.

2. Description of the Related Art

Examples of vehicle mirrors equipped with a semitransparent reflective film are described in Japanese Utility Model Laid-Open No. 60-49045 and Japanese Patent Laid-Open Nos. 2000-255321, 2000-153736, and 2002-67806. In vehicle mirrors equipped with a semitransparent reflective film, the rear face side of a mirror element is made black or otherwise dark to block light passing through the semitransparent reflective film. For example, according to Japanese Utility Model Laid-Open No. 60-49045, a black absorbing film is formed on the rear face of a mirror element by a vacuum film forming method such as sputtering. According to Japanese Patent Laid-Open No. 2000-255321, a color plate is installed on the rear face of a mirror element. According to Japanese Patent Laid-Open No. 2000-153736, a color coating is applied to the rear face of a mirror element. According to Japanese Patent Laid-Open No. 2002-67806, a black paint coating is formed on the rear face of a mirror element.

The present invention provides a vehicle mirror and a manufacturing method therefor which allow the rear face side of a mirror element to be dark-colored without using a color plate or color coating.

SUMMARY OF THE INVENTION

A vehicle mirror according to the present invention includes, a mirror element in which a semitransparent reflective film is formed on the front face or the rear face of a transparent substrate; and a dark-colored self-adhesive film which is attached to the rear face of the mirror element and whose attaching side is dark-colored, wherein the dark-colored self-adhesive film has air release channels on a surface of an adhesive layer before the dark-colored self-adhesive film is attached to the mirror element, and when the dark-colored self-adhesive film is heated and/or pressurized after being attached to the mirror element, the air release channels are eliminated (eliminated completely or almost eliminated so as not to be unpleasant to the eye) as viewed from a front side of the mirror element.

By making the rear face side of the mirror element black or otherwise dark using the dark-colored self-adhesive film, the present invention can block light passing through the semitransparent reflective film. Since the dark-colored self-adhesive film has the air release channels on the surface of the adhesive layer before the dark-colored self-adhesive film is attached to the mirror element, the dark-colored self-adhesive film can be attached to the mirror element without entrapping air bubbles between the mirror element and the dark-colored self-adhesive film. Also, since the air release channels are eliminated as the dark-colored self-adhesive film is heated and/or pressurized after being attached to the mirror element, the air release channels are not visible when viewed from the front side of the mirror element. When the transparent substrate is made of glass, the dark-colored self-adhesive film also serves to prevent shattering in case the glass substrate is broken. When a conventional color plate or color coating or a black absorbing film formed by a conventional vacuum film forming method is used for dark-coloring, to prevent shattering, a shatter-resistant film needs to be attached separately. This increases the number of parts and number of assembly man-hours. On the other hand, the use of the dark-colored self-adhesive film according to the present invention eliminates the need to separately provide a shatter-resistant film, and thus can reduce the number of parts and number of assembly man-hours. The dark-colored self-adhesive film may be, for example, a dark-colored self-adhesive film with grid-like air release channels manufactured by Sumitomo 3M Ltd. Alternatively, it is conceivable to form air bleed holes in the dark-colored self-adhesive film for air-bubble prevention, but a film with air bleed holes is unsuitable for a vehicle mirror because the air bleed holes are unpleasant to the eye, being visible from the front side of the mirror element.

A manufacturing method for the vehicle mirror according to the present invention includes the steps of: preparing a mirror element in which a semitransparent reflective film is formed on the front face or the rear face of a transparent substrate; preparing a dark-colored self-adhesive film whose attaching side is dark-colored and which has air release channels formed on a surface of an adhesive layer before the dark-colored self-adhesive film is attached to a target surface; attaching the dark-colored self-adhesive film to the rear face of the mirror element; and heating and/or pressurizing the mirror element with the dark-colored self-adhesive film attached and thereby eliminating the air release channels (eliminating the air release channels completely or almost eliminating the air release channels so as not to be unpleasant to the eye) as viewed from a front side of the mirror element. The heating can be done using, for example, a heater such as a fan heater or heating oven. For the pressurizing, for example, the mirror element can be pressurized by a pressurizer (e.g., passed through pressure rollers). Alternatively, the heating and pressurizing may be done simultaneously using heating pressure rollers.

BRIEF DESCRIPTION OF THE DRAWINGS

FIGS. 5A and 5B are enlarged photographs of the mirror element 14 as viewed from the front, where FIG. 5A shows how grid-like air release channels 26 are visible after the dark-colored self-adhesive film 20 is attached to the rear face of the mirror element 14 but before heating and pressurizing, and FIG. 5B shows how the grid-like air release channels 26 have been eliminated as a result of heating and pressurizing;

DETAILED DESCRIPTION OF THE PREFERRED EMBODIMENTS

First Embodiment

Figure 1A:
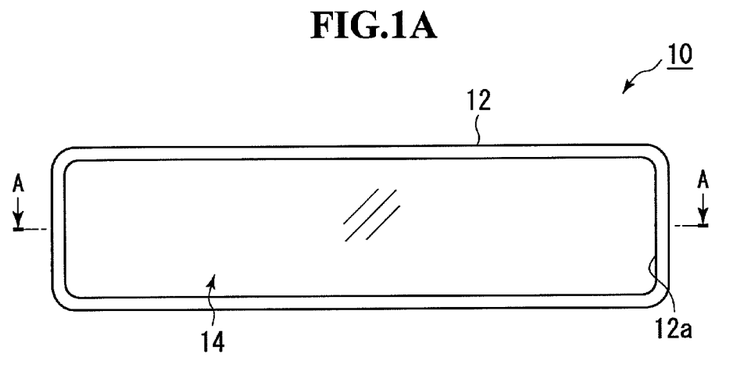
FIGS. 1A and 1B are a front view and sectional view of a vehicle mirror according to a first embodiment of the present invention, where the vehicle mirror is configured as a front surface anti-glare interior mirror.
Figure 1B:
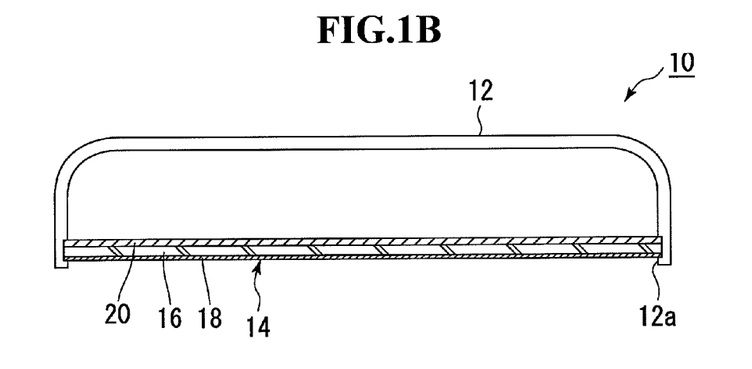

A vehicle mirror according to a first embodiment of the present invention is shown in FIGS. 1A and 1B. The vehicle mirror 10 is configured as a front surface anti-glare interior mirror. FIG. 1A is a front view and FIG. 1B is a sectional view taken along line A-A in FIG. 1A. Fitting a mirror element 14 in a front opening 12a of a housing 12 configures the interior mirror 10. The mirror element 14 is configured as a front surface mirror in which a semitransparent reflective film 18 made of a dielectric multilayer film is formed on the front face of a flat transparent substrate 16. Available materials for the transparent substrate include acrylic, polycarbonate, and other transparent resins as well as glass, but glass is suitable in terms of scratch resistance and formability (smoothness and low distortion). A dark-colored (e.g., black) self-adhesive film 20 is attached to the entire rear face of the mirror element 14. The dark-colored self-adhesive film 20 can be configured by forming an adhesive layer on the rear face of a resin film. The dark-colored self-adhesive film 20 serves to prevent an interior of the housing 12 from being seen through the mirror element 14 from a front side of the interior mirror 10.

Figure 2:
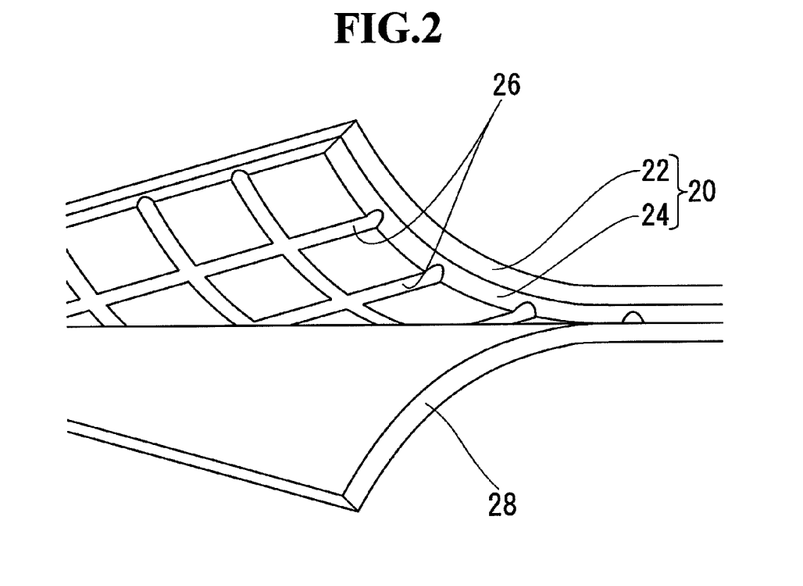
FIG. 2 is a diagram showing a configuration example of a dark-colored self-adhesive film 20 in FIGS. 1A and 1B, where the dark-colored self-adhesive film 20 is partially separated from a release liner (release paper) 28 before being attached to a mirror element.

FIG. 2 shows a configuration example of the dark-colored self-adhesive film 20, which, in this case, is a decorative film with grid-like air release channels, manufactured by Sumitomo 3M Ltd. The dark-colored self-adhesive film 20 is formed by applying an acrylic adhesive layer 24 to the rear face of a highly weather-resistant film layer 22. The film layer 22 is dark-colored in an entire thickness direction and is almost impervious to light. The adhesive layer 24 is transparent, allowing the dark color of the film layer 22 to be seen directly from the rear face side (the side of the adhesive layer 24). Grid-like air release channels 26 (Micro Comply) are formed on the entire surface of the adhesive layer 24, showing a pattern of fine-pitched vertical and horizontal stripes with minimal depth. Before the dark-colored self-adhesive film 20 is attached to the rear face of the mirror element 14, i.e., to a target surface, a liner (release paper) 28 is removed from the surface of the adhesive layer 24. The dark-colored self-adhesive film 20 is originally designed such that the film layer 22 side will be used as an aesthetic surface (visible surface), but the adhesive layer 24 side will be used here as an aesthetic surface. Among existing products from Sumitomo 3M Ltd., "Blackout Film" with grid-like air release channels, for example, can be used suitably as the dark-colored self-adhesive film 20. The Blackout Film has originally been prepared for use in trimming car door frames and the like, and the film layer 22 is black in color. Also, the rear, adhesive side displays a black color with the color of the film layer 22 being seen as it is, and thus the Blackout Film is suitable as the dark-colored self-adhesive film 20 in which the adhesive layer 24 is used as an aesthetic surface.

Figure 3:
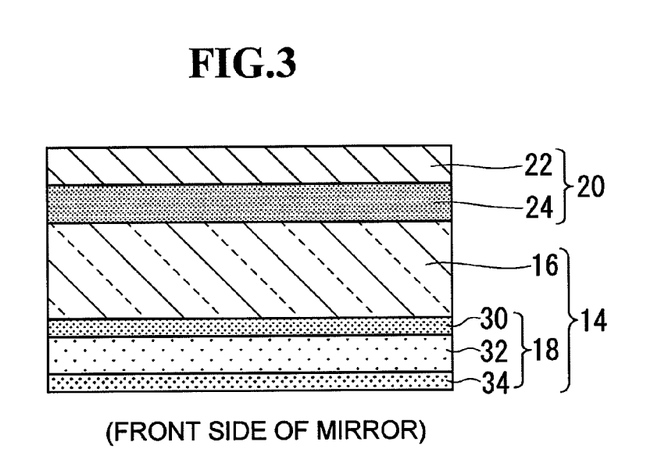
FIG. 3 is an enlarged cross sectional view schematically showing part of a mirror element 14 to which the dark-colored self-adhesive film 20 in FIG. 1B is attached.
Figure 4:
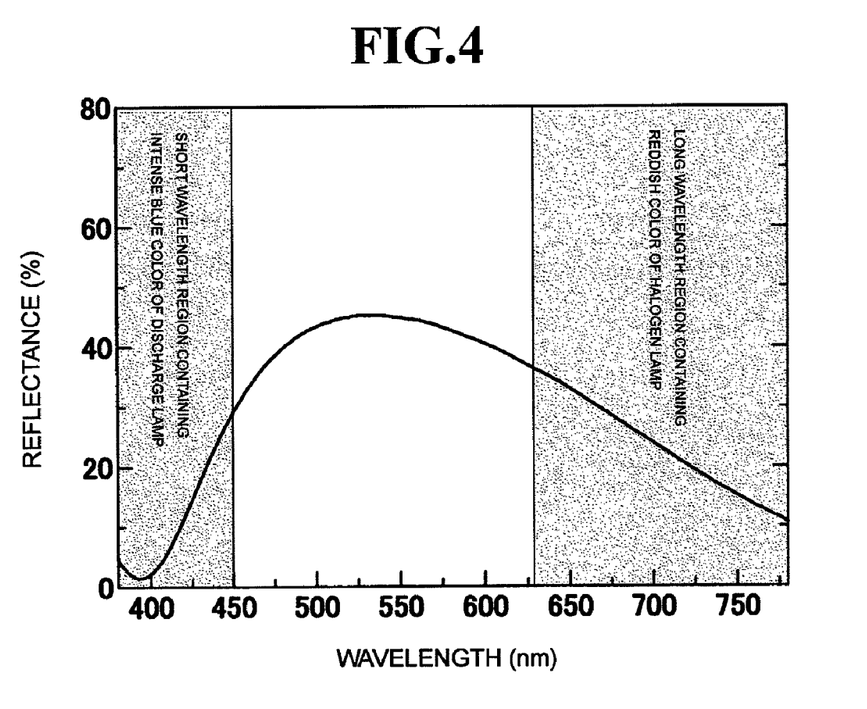
FIG. 4 is a reflectance characteristics curve of the mirror element 14 in FIG. 3.

FIG. 3 is an enlarged cross sectional view schematically showing part of the mirror element 14 to which the dark-colored self-adhesive film 20 in FIG. 1B is attached. The transparent substrate 16 is made, for example, of soda-lime glass. The semitransparent reflective film 18 is formed on the front face of the transparent substrate 16. The semitransparent reflective film 18 is made of a dielectric multilayer film, which is formed of three layers—a high refractive index film 30, low refractive index film 32, and high refractive index film 34—laminated on the front face of the transparent substrate 16 in this order. The layers 30, 32, and 34 are made of materials which do not or almost do not absorb visible light. Optical film thickness of each of the layers 30, 32, and 34 is $\lambda/4$ (where $\lambda$ is a reference wavelength, which, for example, is 530 nm). A reflection peak wavelength of the mirror element 14 in a visible-light region is set at 500 nm to 550 nm. FIG. 4 shows a reflectance characteristics curve of the mirror element 14 in FIG. 3 when the high refractive index film is made of $TiO_2$, the low refractive index film is made of $SiO_2$, and the high refractive index film is made of $TiO_2$. The characteristics curve has a single reflection peak in the visible-light region. As can be seen from the characteristics curve, the semitransparent reflective film 18 provides a reflectance needed for a vehicle mirror. The reflection peak wavelength in the visible-light region is approximately 530 nm, at which the reflectance is 45%. Also, the reflectance attenuates gradually on both ends of the reflection peak wavelength. Consequently, reflected light intensity can be reduced both in a short wavelength region (wavelength region shorter than approximately 450 nm) containing an intense blue color of a discharge lamp and a long wavelength region (wavelength region longer than approximately 630 nm) containing a reddish color of a halogen lamp, providing a high anti-glare effect. Incidentally, an anti-contamination effect can be obtained if a photocatalyst film made of $TiO_2$ or the like is used for the high refractive index film 34 in the outermost layer.

An example of a step of attaching the dark-colored self-adhesive film 20 to the mirror element 14 will be described.

(1) Prepare the mirror element 14 by forming the semitransparent reflective film 18 on the front face of the transparent substrate 16.

(2) Prepare Blackout Film with grid-like air release channels (e.g., FRW3043J or FRA0045J) manufactured by Sumitomo 3M Ltd. as the dark-colored self-adhesive film 20.

(3) Attach the dark-colored self-adhesive film 20 to the rear face of the mirror element 14. In so doing, if the dark-colored self-adhesive film 20 is attached to the rear face of the mirror element 14 while pushing a spatula against the front side of the dark-colored self-adhesive film 20, air entrapped between the mirror element 14 and dark-colored self-adhesive film 20 is released outside along the grid-like air release channels 26. This makes it possible to attach the dark-colored self-adhesive film 20 smoothly without leaving air bubbles.

(4) Cut off excess part of the dark-colored self-adhesive film 20 jutting out from the surface of the mirror element 14.

Figure 5A:
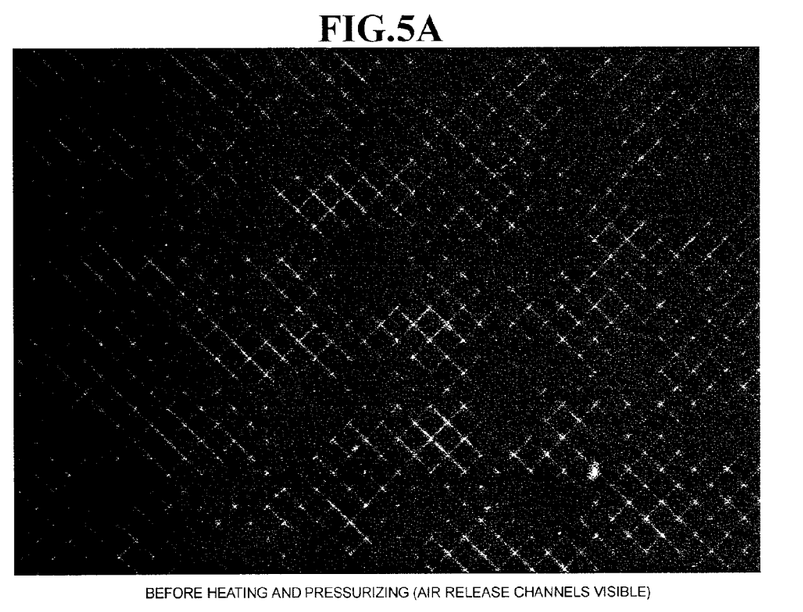
Figure 5B:
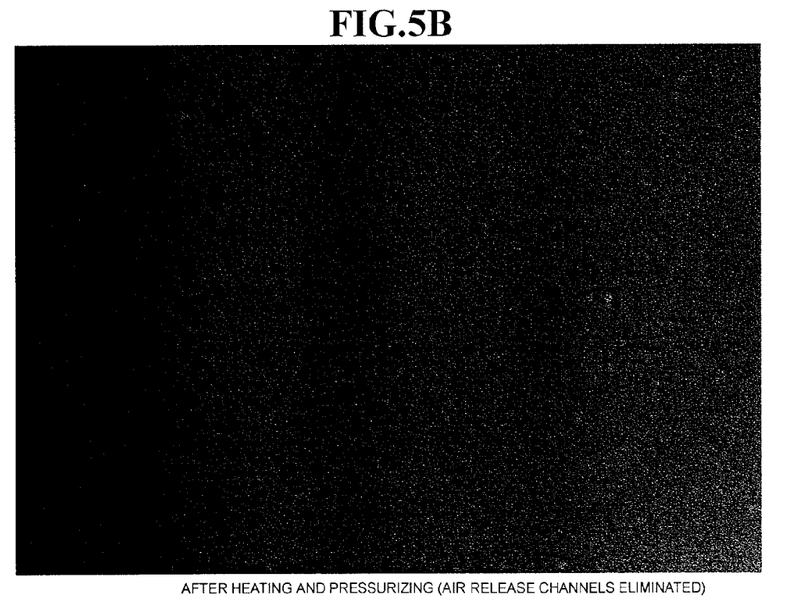

(5) This is sufficient for normal applications in which the film layer 22 side is used as an aesthetic surface, but it was found that this was not sufficient for the present application in which the adhesive layer 24 side is used as an aesthetic surface. That is, if the dark-colored self-adhesive film 20 is simply attached to the rear face of the mirror element 14, although air bubbles do not remain, the grid-like air release channels 26 (shown as grid lines in FIG. 5A) are visible from the surface of the mirror element 14 as shown in the photo in FIG. 5A. This is unpleasant to the eye. To deal with this, the mirror element 14 with the dark-colored self-adhesive film 20 attached was heated by a heater (such as a fan heater or heating oven), and then immediately passed between two rotating rollers of a pressure roller (in a longitudinal direction of the mirror element 14 under a pressure of 0.3 MPa or above, for 10 to 15 seconds). As a result, the grid-like air release channels 26 were eliminated as shown in the photo in FIG. 5B when viewed from the front face of the mirror element 14. Desirably, heating temperature is between 50° C. and 80° C. inclusive because a heating temperature higher than 80° C. will make the mirror element 14 too hot for an operator to hold by hand, resulting in poor workability, and a heating temperature lower than 50° C. will not produce sufficient heating effect. If a roller laminator equipped with heating rollers is used, heating and pressurizing can be done simultaneously. The grid-like air release channels 26 can be eliminated by simply heating with a heater without pressurizing, but it takes a somewhat longer time to eliminate them. Also, the grid-like air release channels 26 can be eliminated by simply pressurizing with pressure rollers without heating, but when heating is used together, a lower pressure is required and thus a load on the mirror element 14 can be reduced.

Second Embodiment

Figure 6:
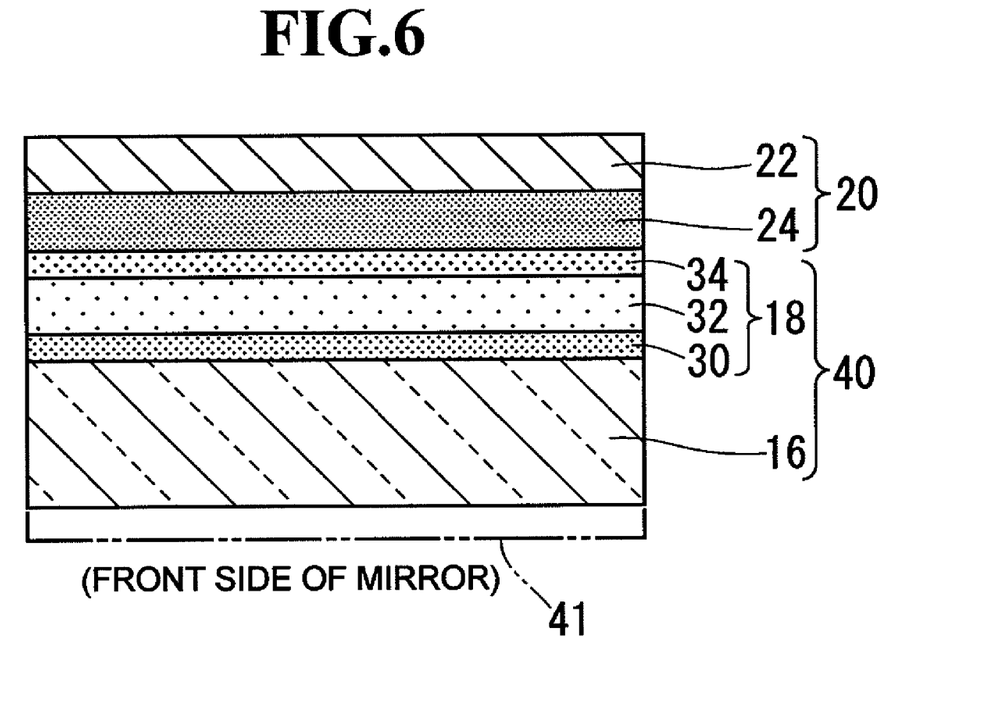
FIG. 6 is an enlarged cross sectional view schematically showing part of a mirror element 40 of a vehicle mirror according to a second embodiment of the present invention, where the vehicle mirror is configured as a rear surface anti-glare interior mirror.

A vehicle mirror according to a second embodiment is shown in FIG. 6. The vehicle mirror is configured as a rear surface anti-glare interior mirror. Configuration of the second embodiment is the same as the first embodiment except for a mirror element 40, and thus illustration and description of overall configuration of an interior mirror will be omitted. The same components as those in the first embodiment are denoted by the same reference numerals as the corresponding components in the first embodiment. Structure of the mirror element 40 will be described. A semitransparent reflective film 18 is formed on the rear face of a transparent substrate 16 made of glass or the like. The semitransparent reflective film 18 is made of a dielectric multilayer film, which is formed of three layers—a high refractive index film 30, low refractive index film 32, and high refractive index film 34—laminated on the rear face of the transparent substrate 16 in this order. An anti-contamination effect can be obtained if a photocatalyst film 41 made of $TiO_2$ or the like is formed separately on the front surface of the mirror element 40. A dark-colored self-adhesive film 20 is attached to the front surface of the semi-transparent reflective film 18 (the rear face of the mirror element 40). The dark-colored self-adhesive film 20, which is the same as the one described in the first embodiment, is configured by forming an adhesive layer 24 on the rear face of a dark-colored film layer 22 by means of application. The dark-colored self-adhesive film 20 can be attached to the mirror element 40 using the same steps as those described in the first embodiment.

Third Embodiment

Figure 7A:
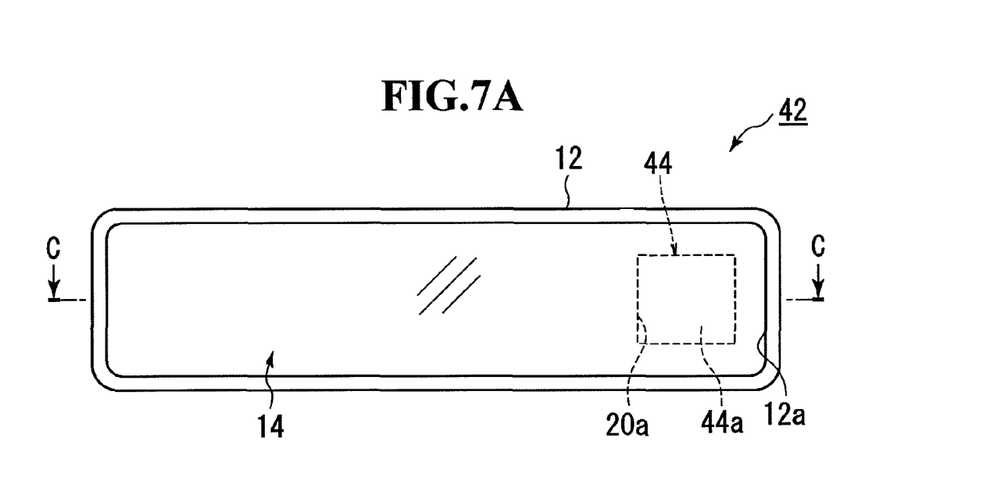
FIGS. 7A and 7B are a front view and sectional view of a vehicle mirror according to a third embodiment of the present invention, where the vehicle mirror is configured as a front surface anti-glare interior mirror with a built-in light-emitting display.
Figure 7B:
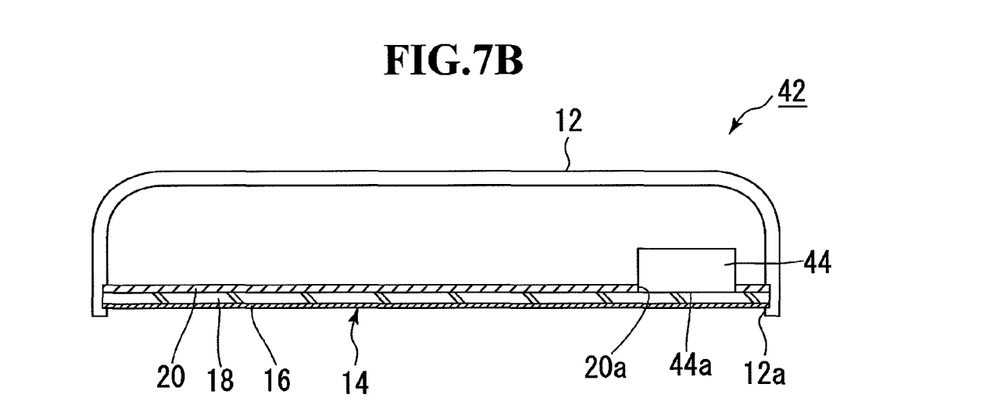

A vehicle mirror according to a third embodiment of the present invention is shown in FIGS. 7A and 7B. The vehicle mirror 42 is built by incorporating a light-emitting display 44 into the vehicle mirror 10 (a front surface anti-glare interior mirror) according to the first embodiment (FIG. 1). The same components as those in the first embodiment are denoted by the same reference numerals as the corresponding components in the first embodiment. An opening 20a is formed in an appropriate region (which is close to the driver's eye, i.e., the right corner on the surface of a mirror element 14 in FIGS. 7A and 7B) of a dark-colored self-adhesive film 20. In a housing 12, the light-emitting display 44 is installed behind the mirror element 14 with a display surface 44a facing the opening 20a of the dark-colored self-adhesive film 20. The light-emitting display 44 is a liquid crystal display, EL display, or the like. The light-emitting display 44 is mounted and supported at an appropriate location in the housing 12.

Figure 8:
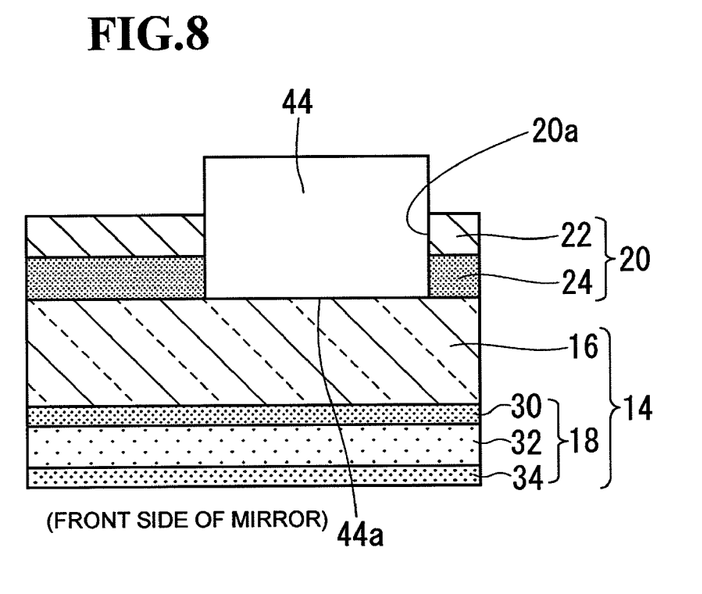
FIG. 8 is an enlarged cross sectional view schematically showing part of a mirror element 14 to which the dark-colored self-adhesive film 20 in FIG. 7B is attached.

FIG. 8 is an enlarged cross sectional view schematically showing part (a region in which the light-emitting display 44 is installed) of the mirror element 14 to which the dark-colored self-adhesive film 20 in FIG. 7B is attached. The opening 20a is formed in the dark-colored self-adhesive film 20 and the light-emitting display 44 is installed with the display surface 44a facing the opening 20a. The rest of the configuration is the same as the first embodiment described with reference to FIG. 3. The dark-colored self-adhesive film 20 with the opening 20a formed in advance can be attached to the mirror element 14 using the same steps as those described in the first embodiment.

Fourth Embodiment

Figure 9:
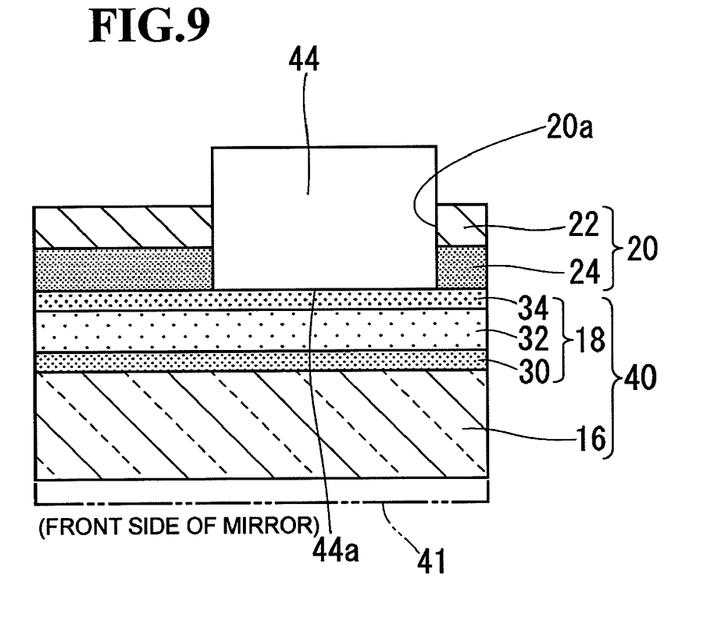
FIG. 9 is an enlarged cross sectional view schematically showing part of a mirror element 40 of a vehicle mirror according to a fourth embodiment of the present invention, where the vehicle mirror is configured as a rear surface anti-glare interior mirror with a built-in light-emitting display.

A vehicle mirror according to a fourth embodiment of the present invention is shown in FIG. 9. The vehicle mirror 42 is built by incorporating a light-emitting display 44 into the vehicle mirror (a rear surface anti-glare interior mirror) according to the second embodiment (FIG. 6). The same components as those in the second embodiment are denoted by the same reference numerals as the corresponding components in the second embodiment. An opening 20a is formed in a dark-colored self-adhesive film 20 and the light-emitting display 44 is installed with a display surface 44a facing the opening 20a. The dark-colored self-adhesive film 20 with the opening 20a formed in advance can be attached to a mirror element 40 using the same steps as those described in the first embodiment.

In incorporating the light-emitting display, the use of a front surface mirror element (third embodiment in FIG. 8) rather than a rear surface mirror element (fourth embodiment in FIG. 9) can make tone difference between the dark-colored self-adhesive film and the display surface of the light-emitting display less conspicuous when the light-emitting display is off.

Although a dielectric multilayer film is used as the semi-transparent reflective film in the embodiments described above, the present invention is similarly applicable when metal or another material is used for the semitransparent reflective film. Also, the air release channels of the dark-colored self-adhesive film are not limited to the vertical and horizontal grid pattern described in the above embodiments, and various other patterns are available. Besides, although the present invention is applied to an interior mirror in the above embodiments, the present invention is also applicable to exterior mirrors and other vehicle mirrors.

What is claimed is:

1. A vehicle mirror comprising:
a mirror element in which a semitransparent reflective film is formed on a front face or a rear face of a transparent substrate; and
a dark-colored self-adhesive film which is attached to a rear face of the mirror element and which has an attaching side which is dark-colored, wherein
the dark-colored self-adhesive film has air release channels on a surface of an adhesive layer before the dark-colored self-adhesive film is attached to the mirror element, and when the dark-colored self-adhesive film is heated or pressurized after being attached to the mirror element, the air release channels are eliminated as viewed from a front side of the mirror element.

2. The vehicle mirror according to claim 1, wherein the air release channels are formed in a grid.

3. The vehicle mirror according to claim 2, wherein the semitransparent reflective film is a dielectric multilayer film.

4. The vehicle mirror according to claim 3, wherein the rear face of the mirror element has a region not covered with the dark-colored self-adhesive film and a light-emitting information display monitor is installed behind the mirror element with a display surface facing the region not covered with the dark-colored self-adhesive film.

5. The vehicle mirror according to claim 2, wherein the rear face of the mirror element has a region not covered with the dark-colored self-adhesive film and a light-emitting information display monitor is installed behind the mirror element with a display surface facing the region not covered with the dark-colored self-adhesive film.

6. The vehicle mirror according to claim 1, wherein the semitransparent reflective film is a dielectric multilayer film.

7. The vehicle mirror according to claim 6, wherein the rear face of the mirror element has a region not covered with the dark-colored self-adhesive film and a light-emitting information display monitor is installed behind the mirror element with a display surface facing the region not covered with the dark-colored self-adhesive film.

8. The vehicle mirror according to claim 1, wherein the rear face of the mirror element has a region not covered with the dark-colored self-adhesive film and a light-emitting information display monitor is installed behind the mirror element with a display surface facing the region not covered with the dark-colored self-adhesive film.

9. A manufacturing method for a vehicle mirror, comprising:
preparing a mirror element in which a semitransparent reflective film is formed on a front face or a rear face of a transparent substrate;
preparing a dark-colored self-adhesive film which has an attaching side which is dark-colored and which has air release channels formed on a surface of an adhesive layer before the dark-colored self-adhesive film is attached to a target surface;
attaching the dark-colored self-adhesive film to a rear face of the mirror element; and
heating or pressurizing the mirror element with the dark-colored self-adhesive film attached thereto, thereby eliminating the air release channels as viewed from a front side of the mirror element.

10. The manufacturing method according to claim 9, wherein the air release channels are formed in a grid.

11. The manufacturing method according to claim 10, wherein the semitransparent reflective film is a dielectric multilayer film.

12. The manufacturing method according to claim 11, wherein when the dark-colored self-adhesive film is attached to the rear face of the mirror element, a region of the rear face of the mirror element is not covered by the dark-colored self-adhesive film, and
the manufacturing method further comprises installing a light-emitting information display monitor behind the mirror element with a display surface facing the region of the rear face of the mirror element not covered with the dark-colored self-adhesive film.

13. The manufacturing method according to claim 10, wherein when the dark-colored self-adhesive film is attached to the rear face of the mirror element, a region of the rear face of the mirror element is not covered by the dark-colored self-adhesive film, and
the manufacturing method further comprises installing a light-emitting information display monitor behind the mirror element with a display surface facing the region of the rear face of the mirror element not covered with the dark-colored self-adhesive film.

14. The manufacturing method according to claim 9, wherein the semitransparent reflective film is a dielectric multilayer film.

15. The manufacturing method according to claim 14, wherein when the dark-colored self-adhesive film is attached to the rear face of the mirror element, a region of the rear face of the mirror element is not covered by the dark-colored self-adhesive film, and
the manufacturing method further comprises installing a light-emitting information display monitor behind the mirror element with a display surface facing the region of the rear face of the mirror element not covered with the dark-colored self-adhesive film.

16. The manufacturing method according to claim 9, wherein when the dark-colored self-adhesive film is attached to the rear face of the mirror element, a region of the rear face of the mirror element is not covered by the dark-colored self-adhesive film, and
the manufacturing method further comprises installing a light-emitting information display monitor behind the mirror element with a display surface facing the region of the rear face of the mirror element not covered with the dark-colored self-adhesive film.

* * * * *